United States Patent
Siebert

(10) Patent No.: US 6,854,780 B2
(45) Date of Patent: Feb. 15, 2005

(54) STORAGE BIN

(75) Inventor: Timothy G. Siebert, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/393,334

(22) Filed: Mar. 20, 2003

(65) Prior Publication Data

US 2004/0183325 A1 Sep. 23, 2004

(51) Int. Cl.[7] .................................................. B60R 7/00
(52) U.S. Cl. ..................................... 296/37.8; 224/37.8
(58) Field of Search ................................. 224/926, 539, 224/564, 566; 296/37.8, 37.12, 37.15; D12/415, 416, 423, 424

(56) References Cited

U.S. PATENT DOCUMENTS

| | | | | | |
|---|---|---|---|---|---|
| D199,462 S | * | 10/1964 | Zack et al. | ................ | D12/424 |
| 4,300,709 A | * | 11/1981 | Page, Jr. | ..................... | 224/275 |
| 4,708,386 A | * | 11/1987 | Moore et al. | ............... | 296/37.8 |
| 4,733,900 A | * | 3/1988 | Fluharty | ..................... | 296/37.8 |
| 4,927,108 A | * | 5/1990 | Blazic et al. | ............. | 248/311.2 |
| D351,585 S | * | 10/1994 | Scheurer | ..................... | D12/424 |
| 5,863,089 A | * | 1/1999 | Ignarra et al. | ............. | 296/37.8 |
| 5,975,342 A | * | 11/1999 | Bradeen et al. | .............. | 220/737 |
| 6,422,440 B1 | * | 7/2002 | Stone | .......................... | 224/275 |
| 6,722,540 B2 | * | 4/2004 | Ling | ........................... | 224/275 |
| 2003/0164628 A1 | * | 9/2003 | Krausz | .................. | 297/188.04 |

OTHER PUBLICATIONS

Navistar International Transportation Corp., "Heater Storage Box," Part Nos. 3513587C1 & 3513588C1, Jul. 9, 1996, Reference No. F9B1617_041.PRT.

* cited by examiner

*Primary Examiner*—Lori L. Coletta
(74) *Attorney, Agent, or Firm*—Jeffrey P. Calfa; Dennis Kelly Sullivan; Susan L. Lukasik

(57) ABSTRACT

A storage bin has an upper storage recess defined by a horizontal upper storage-recess floor and upper storage-recess sidewalls. The horizontal upper-storage recess floor defines a cup-holder opening and a cup-holder recess is defined between cup-holder sidewalls of the storage bin that are supported below the cup-holder opening defined by the horizontal upper storage-recess floor.

28 Claims, 16 Drawing Sheets

US 6,854,780 B2

STORAGE BIN

BACKGROUND OF THE INVENTION

The present invention relates to storage bins with cup holders.

DRAWINGS

Other objects and advantages of the invention will become more apparent upon perusal of the detailed description thereof and upon inspection of the drawings in which.

DETAILS OF INVENTION

Figure 1:
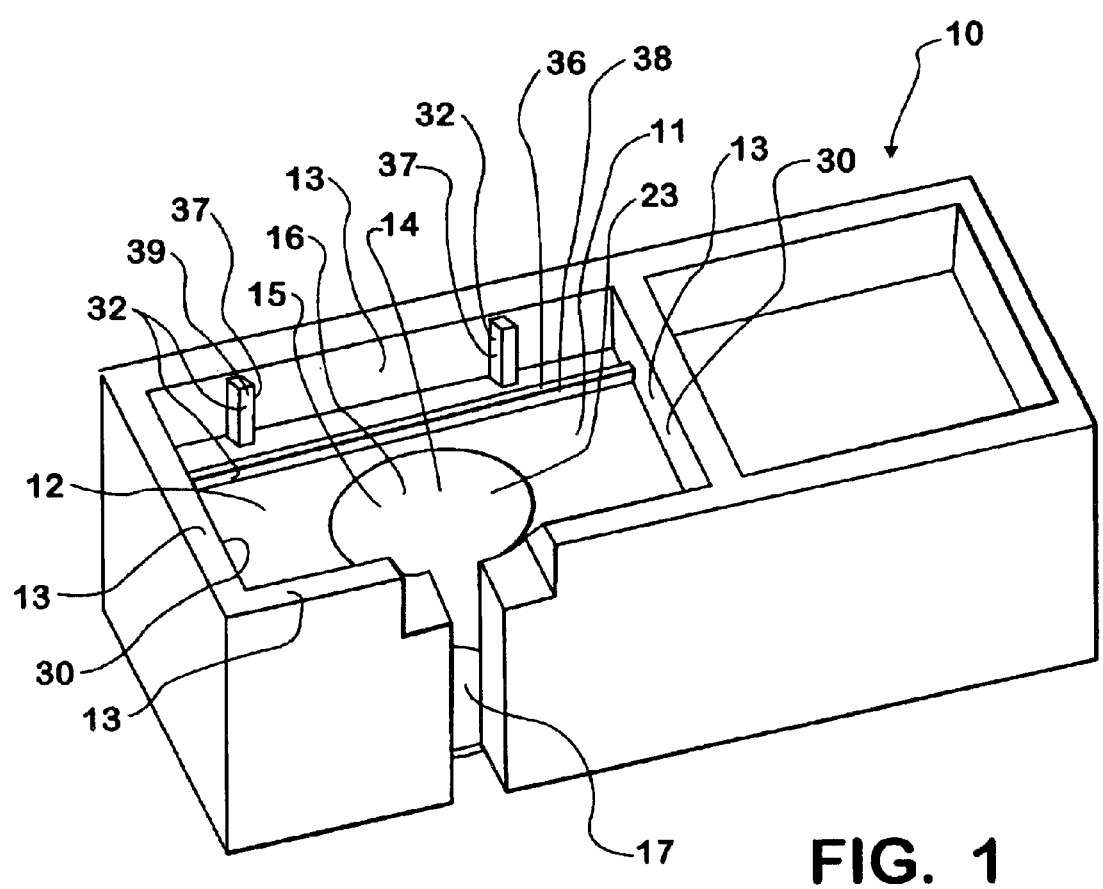
FIG. 1 is a perspective view from the front of a storage bin according to the present invention.
Figure 2:
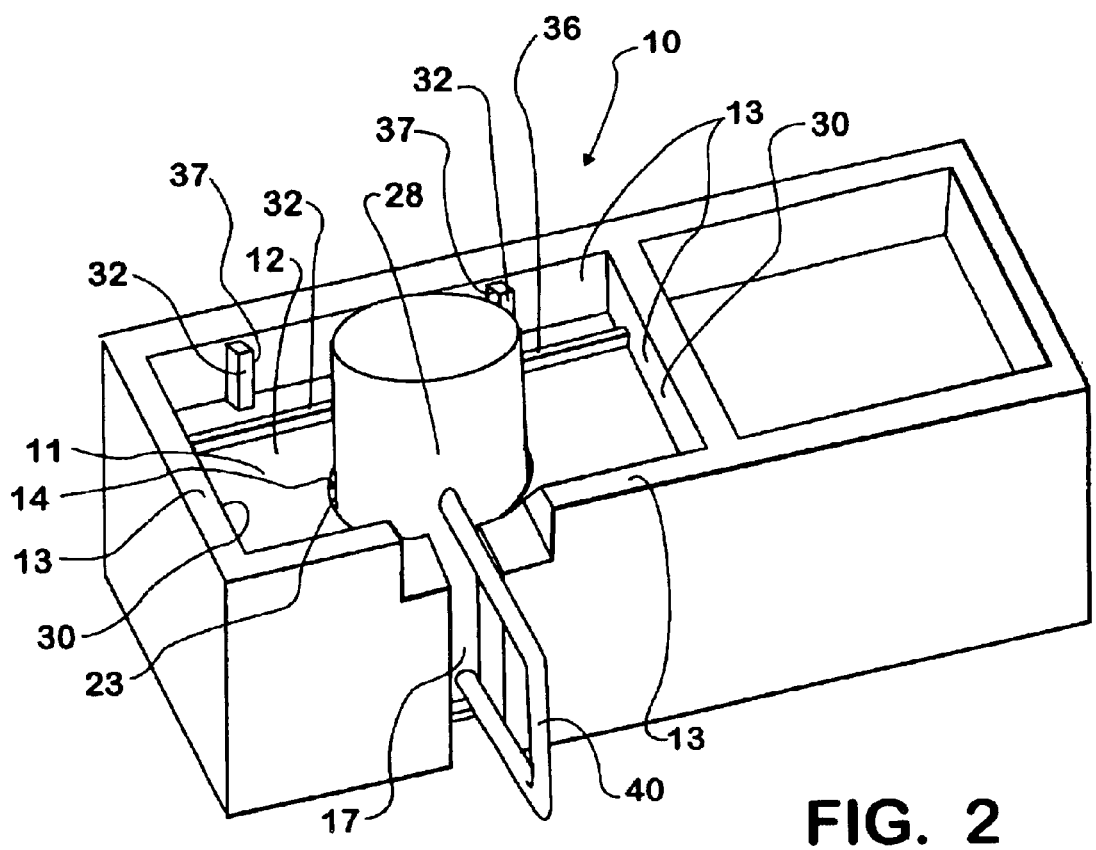
FIG. 2 is a perspective view from the front of a storage bin according to the present invention with a drinking vessel disposed within the cup-holder recess.
Figure 3:
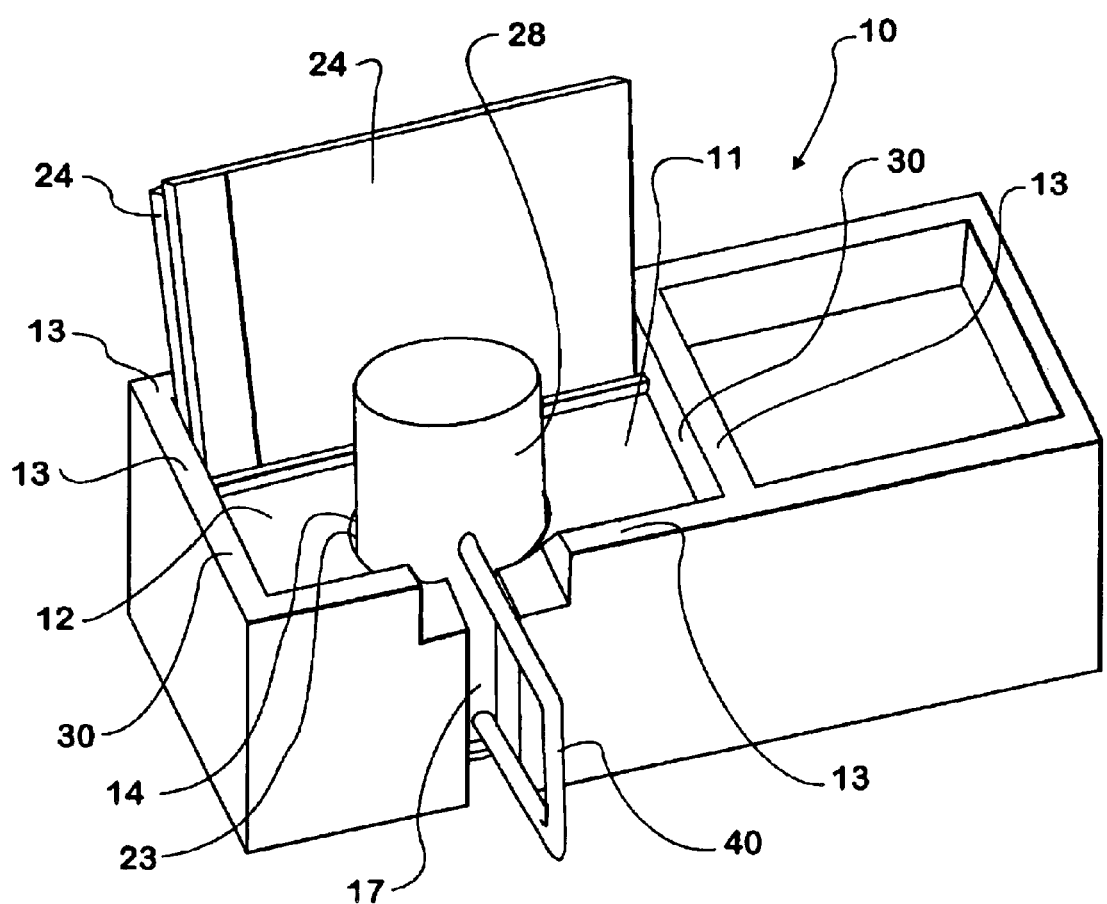
FIG. 3 is a perspective view from the front of a storage bin according to the present invention with a drinking vessel disposed in the cup-holder recess and information-storage device cases disposed in the upper storage recess.
Figure 4:
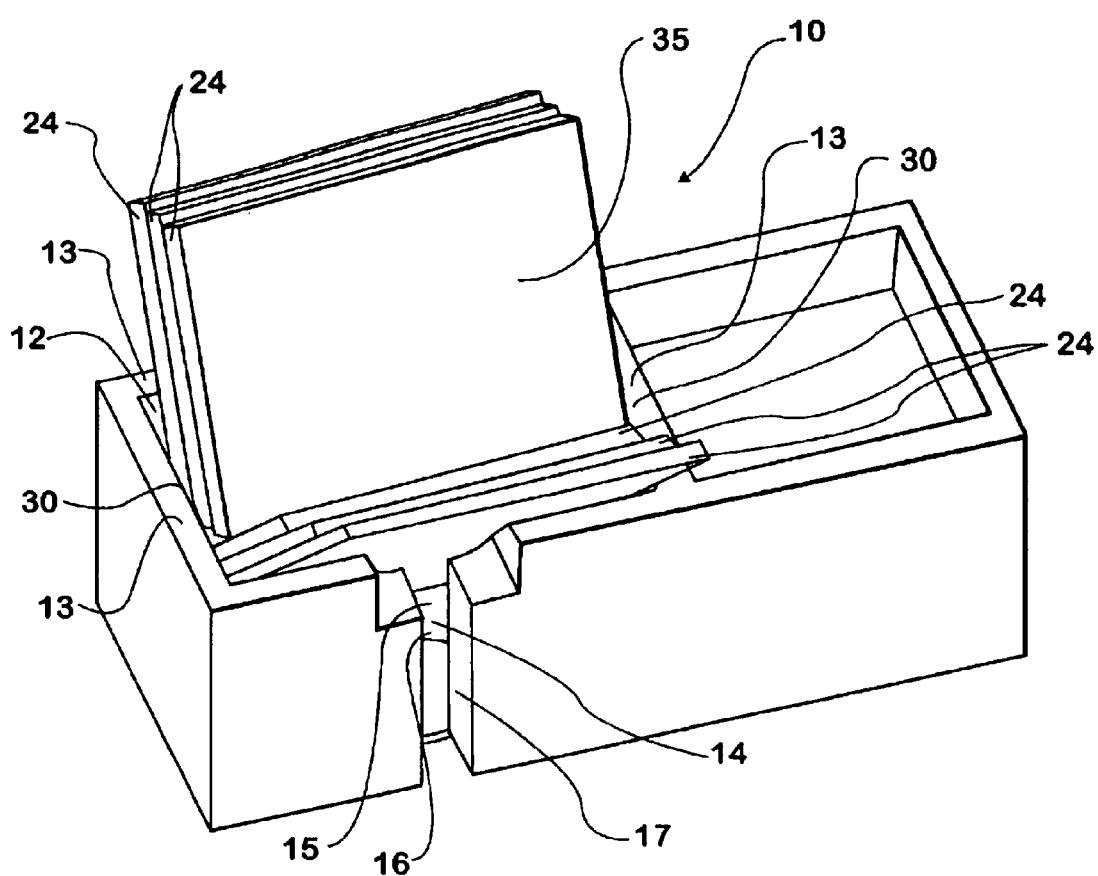
FIG. 4 is a perspective view from the front of a storage bin according to the present invention with information-storage device cases disposed in the upper storage recess.
Figure 5:
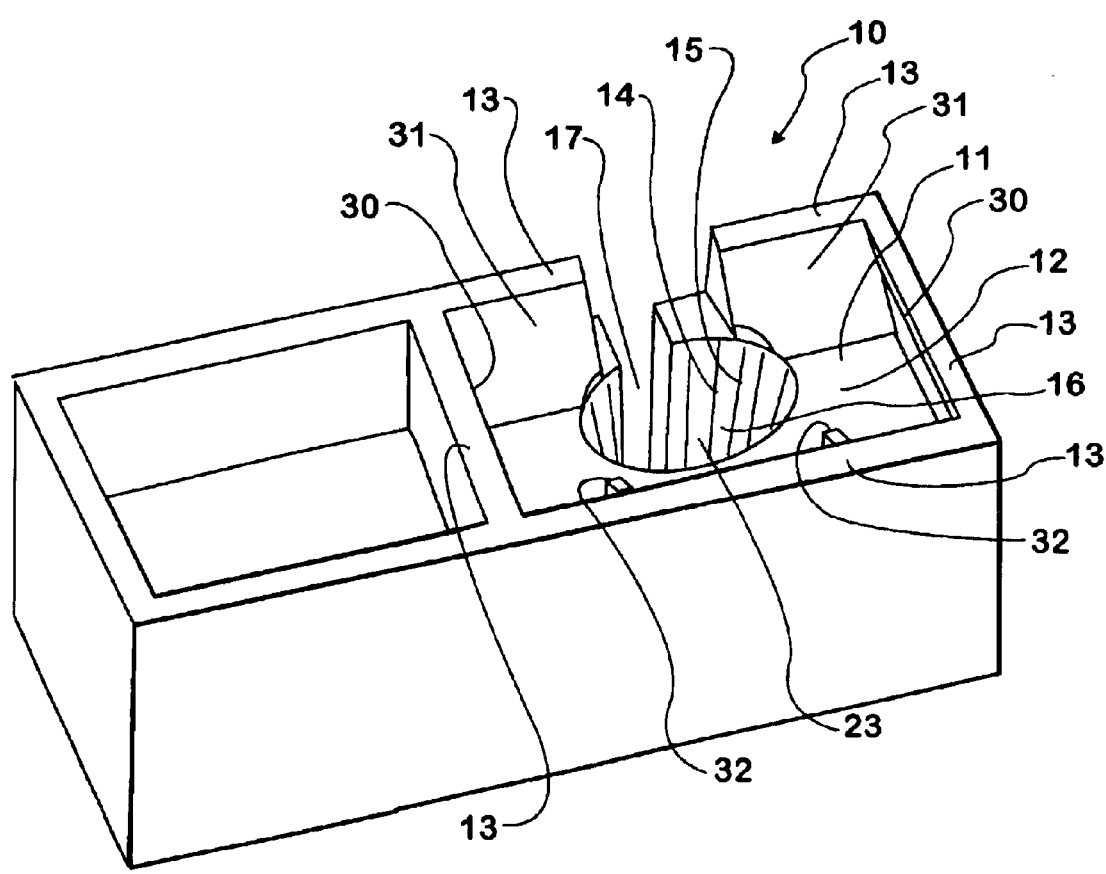
FIG. 5 is a perspective view from the rear of a storage bin according to the present invention.
Figure 6:
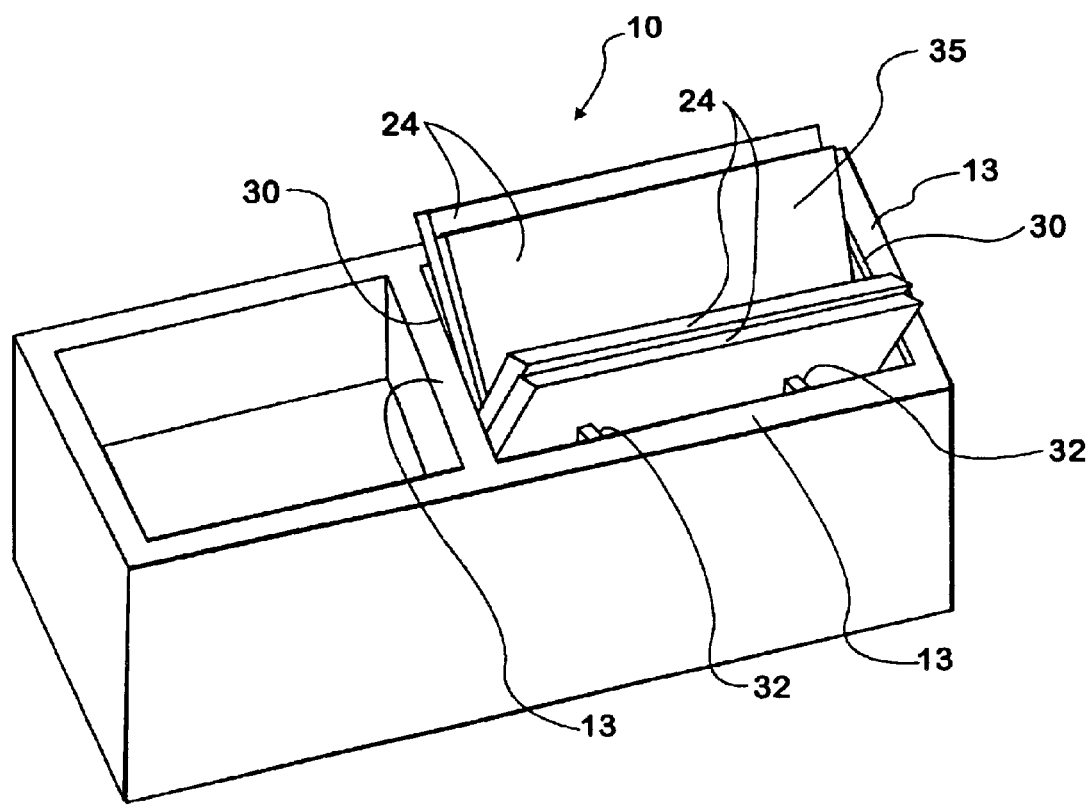
FIG. 6 is a perspective view from the rear of a storage bin according to the present invention with information storage-device cases disposed in the upper storage recess.
Figure 7:
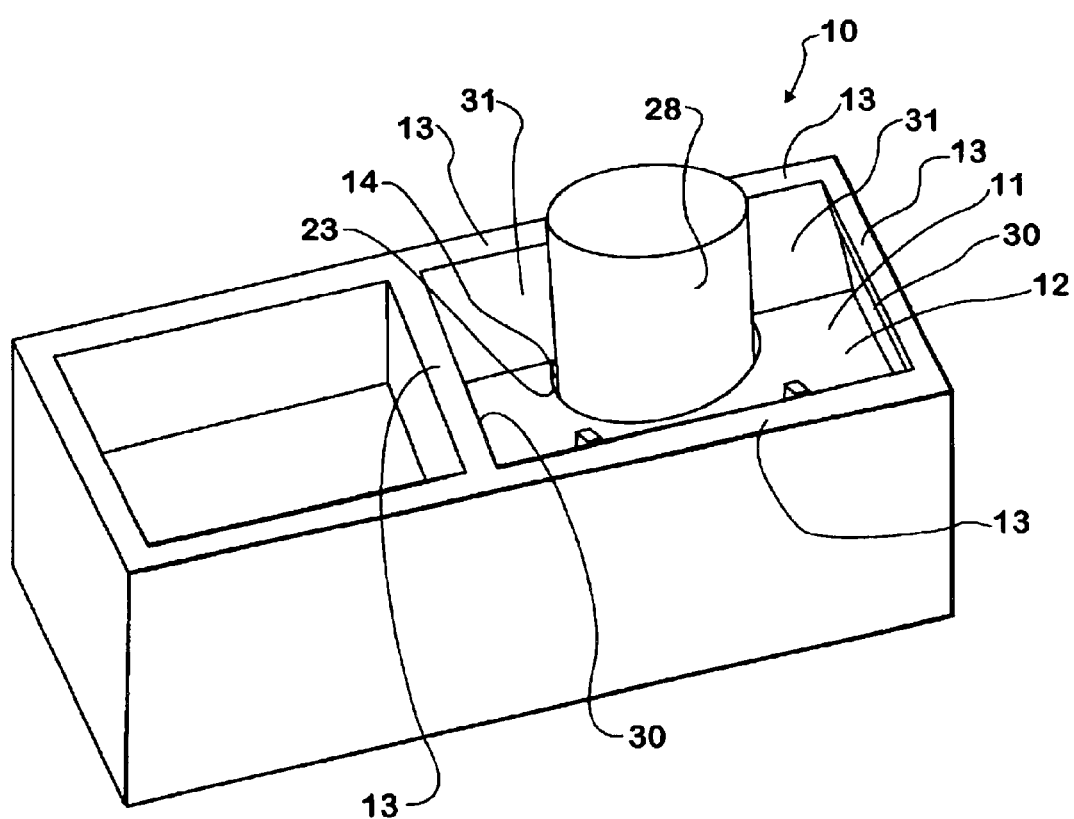
FIG. 7 is a perspective view from the rear of a storage bin according to the present invention with a drinking vessel disposed in the cup-holder recess.
Figure 8:
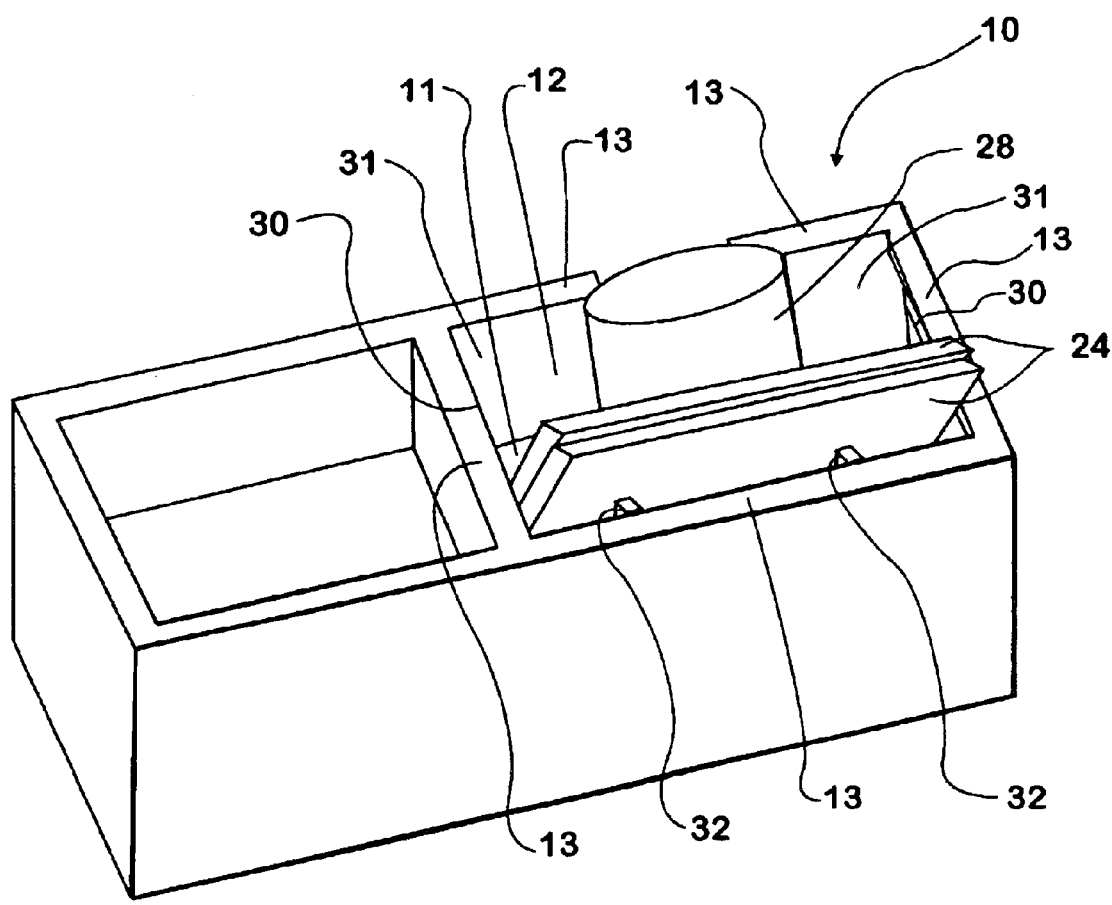
FIG. 8 is a perspective view from the rear of a storage bin according to the present invention with information-storage device cases disposed in the upper storage bin and a drinking vessel disposed in the cup-holder recess.
Figure 9:
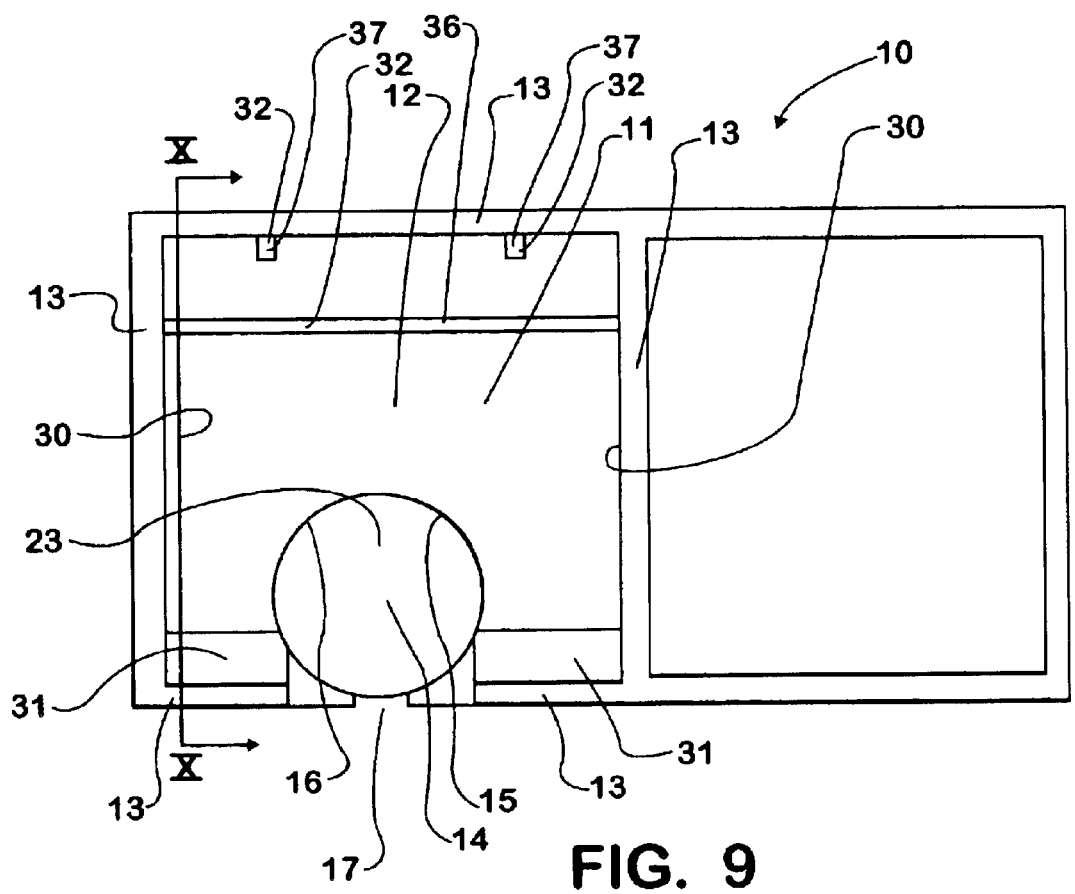
FIG. 9 is a plan of a storage bin according to the present invention.

The present invention is a storage bin 10 with a construction that defines a novel combination of storage features. As can be seen in FIGS. 1–16, a storage bin 10 according to the present invention has an upper storage recess 12 that is defined by a horizontal storage-recess floor 11 and upper storage-recess sidewalls 13 that extend vertically upward adjacent outer edges of the horizontal upper storage-recess floor 11. The horizontal upper storage-recess floor 11 of a storage bin 10 according to the present invention defines a cup-holder opening 23. A storage bin 10 according to the present invention also comprises a cup-holder recess 14 that is defined between cup-holder sidewalls 16 that are disposed below the cup-holder opening 23. The cup-holder sidewalls 16 are vertically extending and are fully or partially cylindrical or conical in shape. In other words, the cup-holder sidewalls 16 are adapted for the reception of a drinking vessel 28 as a result of having significant vertically-extending portions that form at least part of a vertically extending cylinder or cone. As is alluded to immediately above, their may be breaks in the cylindrically and/or conically shaped portions of the cup-holder sidewalls 16 so long as they are not so big as to defeat the purpose of the cup-holder sidewalls 16 to restrain a drinking vessel 28 against significant horizontal movement. It should also be understood that the cup-holder sidewalls 16 of a storage bin 10 according to the present invention may include both cylindrically shaped portions and conically shaped portions at different vertical positions. The placement of the cup-holder recess 14 and the upper storage recess 12 of a storage bin 10 according to the present invention provides the user with very space efficient and flexible storage provisions. The user may choose to, as is illustrated in FIGS. 2, 7, 11, and 12, store a drinking vessel 28 in the cup-holder recess 14 or to, as is illustrated in FIGS. 4, 6, 13, 14, and 15, store other differently shaped and/or larger objects in the upper storage recess 12 disposed generally above the cup-holder recess 14. In some embodiments of the present invention it is even possible to, as is illustrated in FIGS. 3 and 8, simultaneously store a drinking vessel 28 in the cup-holder recess 14 and to store other objects in portions of the upper storage recess 12 adjacent the cup-holder opening 23 defined by the horizontal upper storage-recess floor 11.

Figure 15:
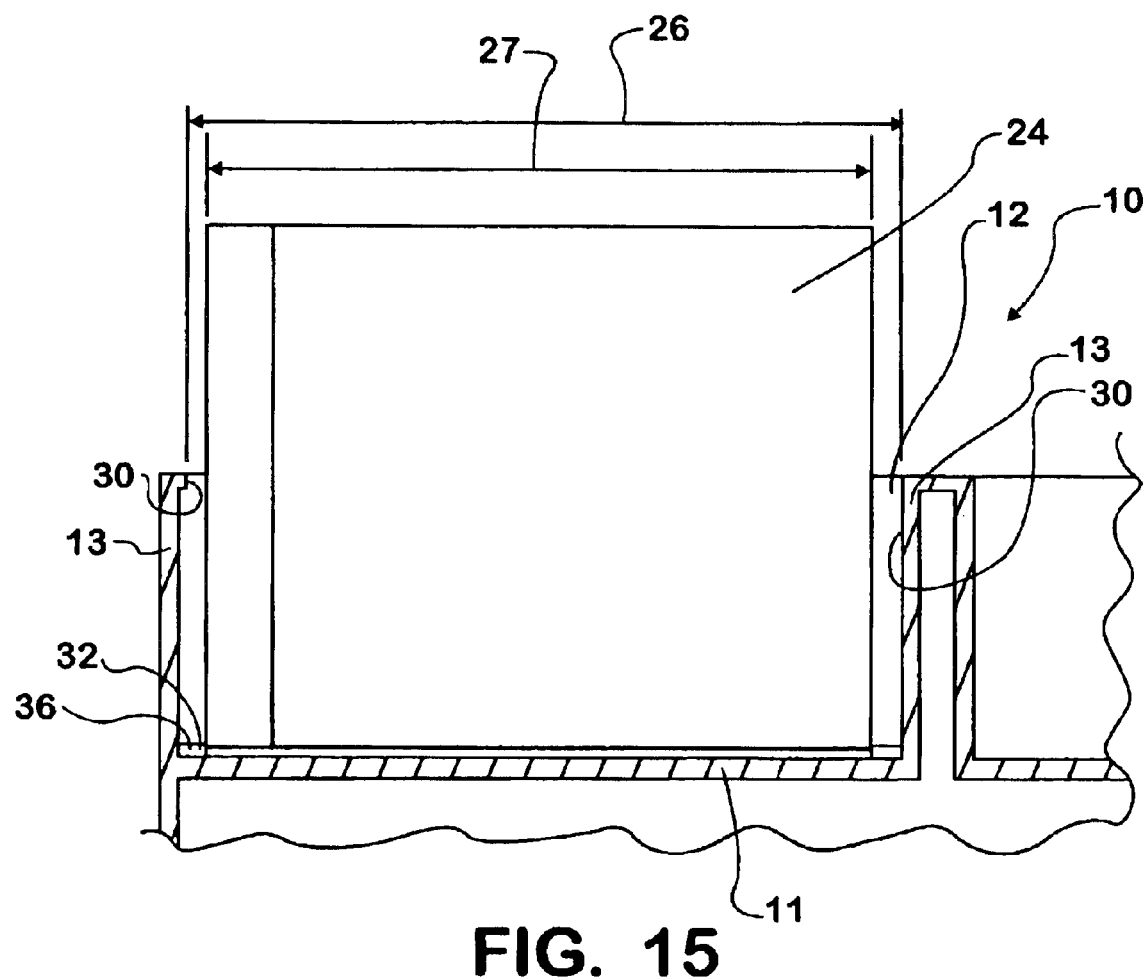
FIG. 15 is a plan view of a storage bin according to the present invention through line XV—XV of FIG. 13.

In some embodiments the storage bin 10 of the present invention is constructed in such a manner that the upper storage recess 12 is particularly well adapted for the storage of information-storage device cases 24 such as compact disc cases. As is best illustrated in FIG. 15, in such embodiments the upper storage-recess sidewalls 13 include a pair of side rails 30 that face each other, are disposed substantially parallel to one another, and are at positions such that a rail-to-rail distance 26 between them has a magnitude that is between an information-storage device case standard width 27 and 20% more than an information-storage device case standard width 27. Such a relative positioning of a pair of side rails 30 ensures that information-storage device cases 24 will fit neatly within the upper storage recess 12 and horizontal movement of the information-storage device cases 24 between the side rails 30 will be limited. Of course, the side rails 30 of such an embodiment of a storage bin 10 may protrude from adjacent portions of the upper-storage recess sidewalls 13, as is the case with the side rail 30 illustrated in the left-hand side of FIG. 15, or they may simply be flush with adjacent portions of the upper storage-recess sidewalls 13 as is the case with the side rail 30 illustrated in the right-hand side of 0 FIG. 15. Embodiments of a storage bin 10 that have a pair of side rails 30 that are so spaced to neatly hold information-storage device cases may have the side rails 30 spaced to neatly fit any of a number of different types of information-storage device cases. In the first commercial implementation of the present invention the storage bin 10 has a pair of side rails 30 that are spaced to neatly fit compact disc cases. The present invention could readily be adapted however to other applications in which it is desirable to provide for the storage of types of well-known information-storage device cases 24 other than compact disc cases. It is also anticipated that future embodiments of storage bins 10 according to the present invention may well be constructed with a pair of side rails 30 that are spaced at a distance to neatly fit types of information-storage device cases that have not yet been devised.

Figure 10:
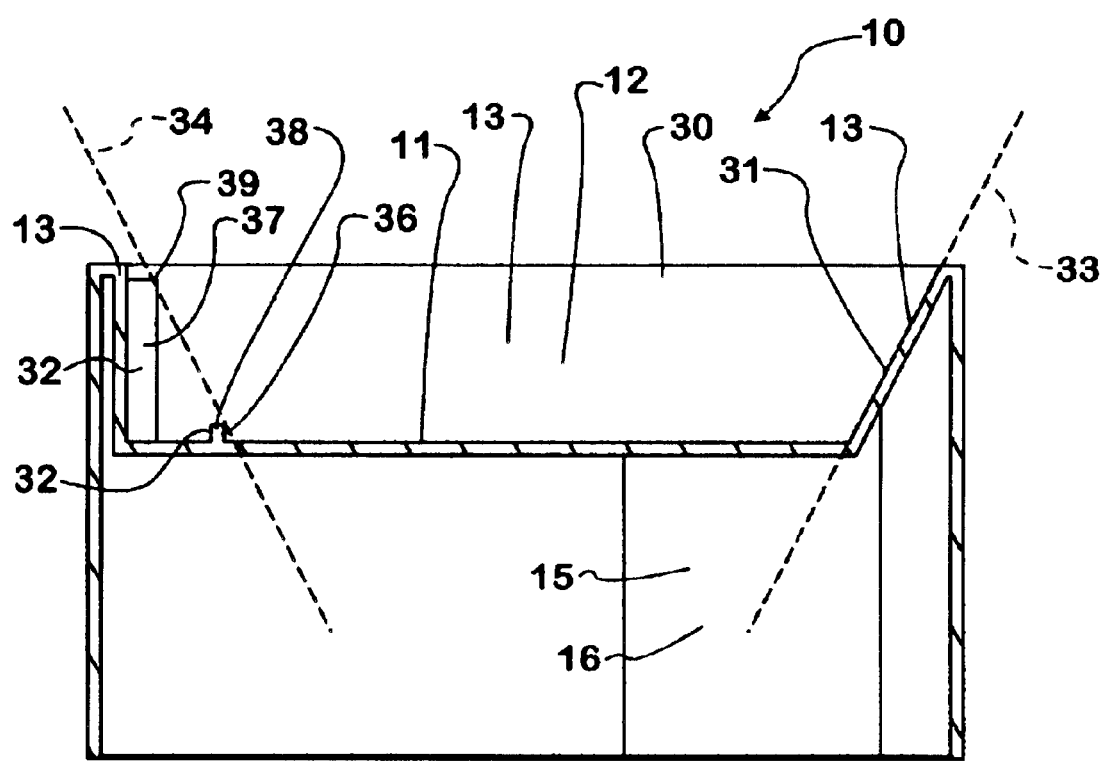
FIG. 10 is a sectional view of a storage bin according to the present invention through line X—X of FIG. 9.
Figure 11:
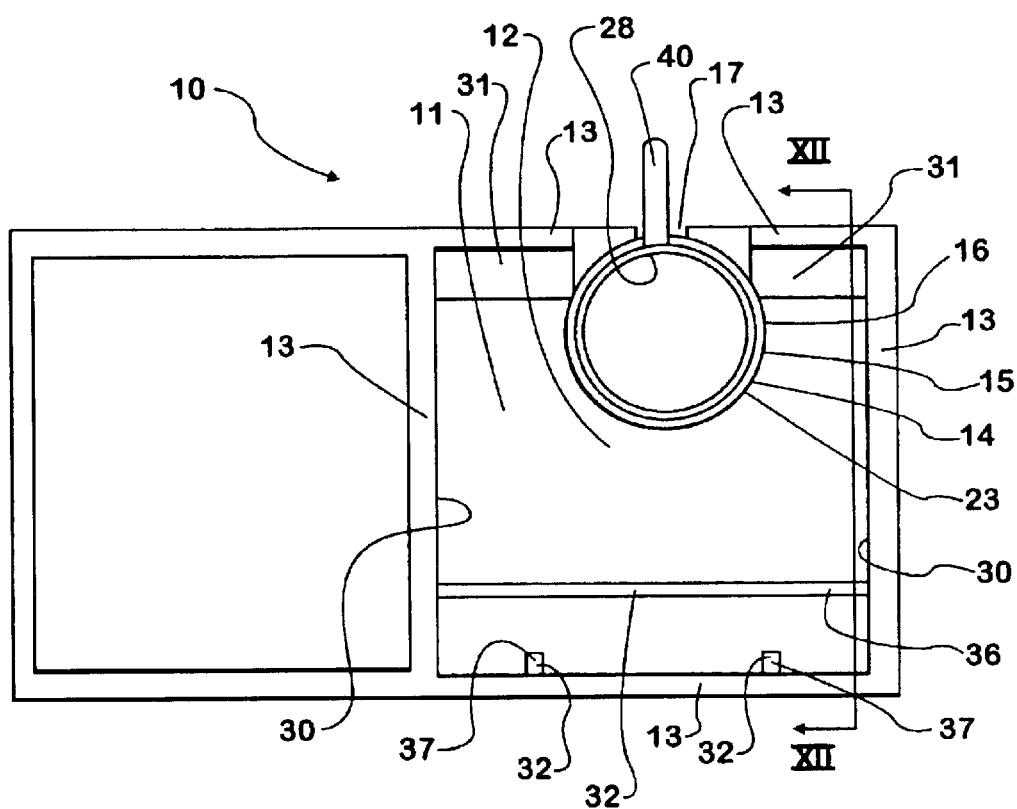
FIG. 11 is a plan view of a storage bin according to the present invention with a drinking vessel disposed in the cup-holder recess.
Figure 12:
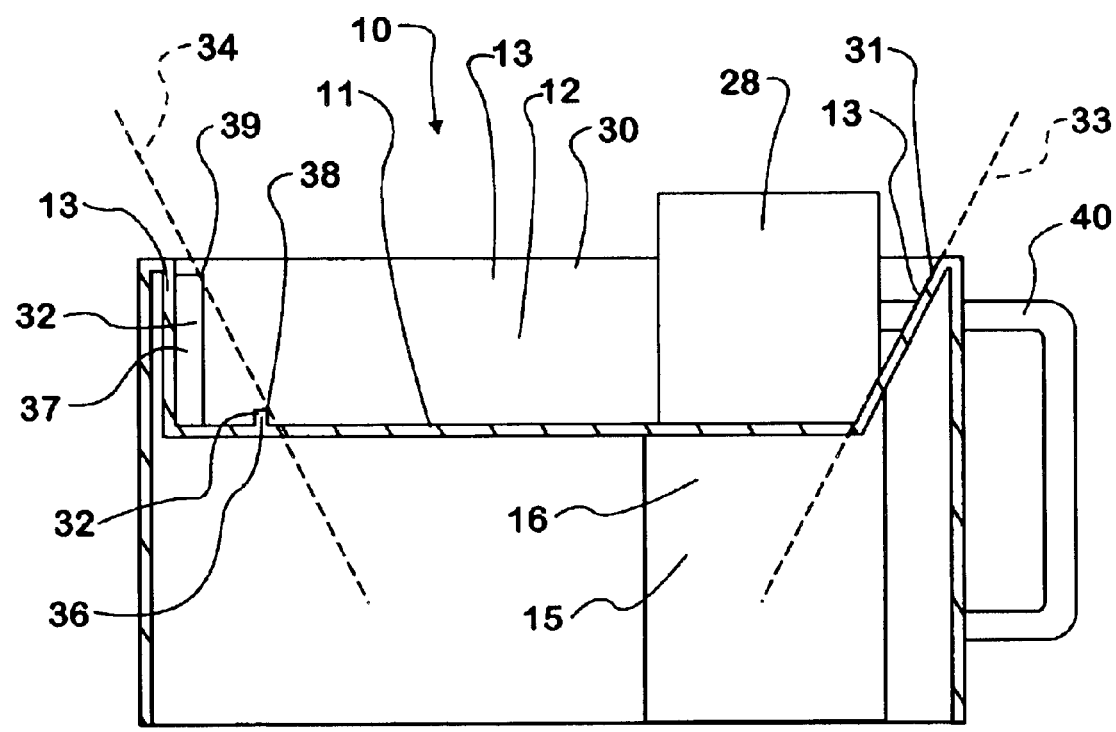
FIG. 12 is a sectional view of a storage bin according to the present invention through line XII—XII of FIG. 11.
Figure 13:
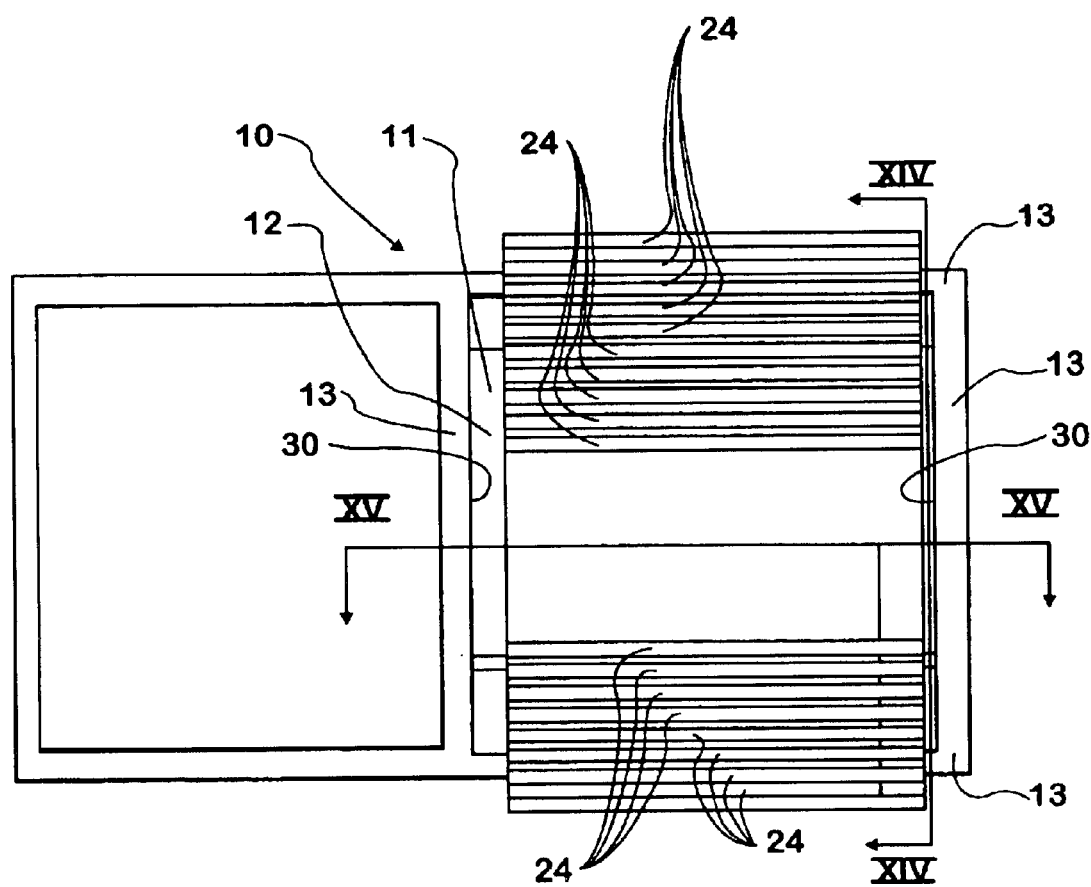
FIG. 13 is a plan view of a storage bin according to the present invention with information-storage device cases disposed in the upper storage recess.
Figure 14:
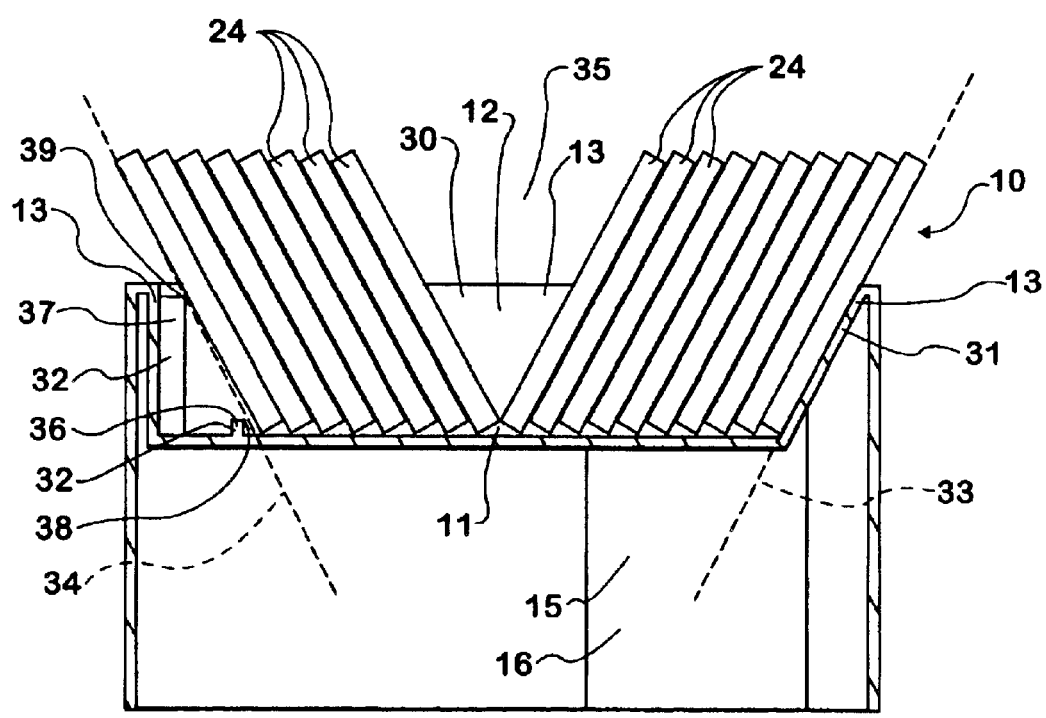
FIG. 14 is a sectional view of a storage bin according to the present invention through line XIV—XIV of FIG. 13.

As is best illustrated in FIG. 14, in some embodiments of the present invention in which the upper storage recess 12 is well suited for the storage of information-storage device cases 24 because of a special spacing of a pair of side rails 30, the storage bin 10 is further constructed to enable a user to easily leaf through information-storage device cases 24 stored in the upper storage recess 12. As is best illustrated in FIGS. 10 and 14, in such embodiments the storage bin 10 includes front support structure 31 that is disposed between the side rails 30 of the upper storage recess 12 and above the horizontal upper storage-recess floor 11 and against which an information-storage device case 24 may rest in a forwardly leaning orientation. In such embodiments the storage bin 10 further comprises rear support structure 32 that is disposed between the side rails 30 of the upper storage recess 12 and above the horizontal upper storage-recess floor 11 and against which an information-storage device case 24 may rest in a rearwardly leaning orientation. The front support structure 31 of such a storage bin 10 has three or more "high points" that are disposed in a common plane which is considered to be a front support plane 33 within which a planar surface of an information-storage device case 24 may rest against the "high points" of the front support structure 31. Likewise, in such embodiments, the rear support structure 32 of such a storage bin 10 has three or more "high points" that are disposed in a common plane which is considered to be a rear support plane 34 within which a planar surface of an information-storage device case 24 may rest against the "high points" of the rear support structure 32. As was alluded to above, in some embodiments of the present invention the front support structure 31 and the rear support structure 32 are constructed in such a manner to facilitate a user leafing through a group of information-storage device cases 24 stored in the upper storage recess 12. In such embodiments of the present invention the front support structure 31 and the rear support structure 32 are constructed in such a manner that their respective "high points" are disposed in a front support plane 33 and a rear support plane 34 that are disposed at an upwardly-opening angle of 20–60 degrees relative to one another. As can be best seen in FIG. 14, in such embodiments one or more information-storage device cases 24 may be directly or indirectly supported against or parallel to the front support plane 33 and at an upwardly-opening angle to one or more information-storage device cases 24 that are supported directly or indirectly against or parallel to the rear support plane 34. In such a circumstance a viewing space 35 is present between any adjacent pair of information-storage device cases 24 one of which is rearwardly leaning and the other of which is forwardly leaning. In such a case the user may create a viewing space 35 in front of a particular information-storage device case 24 by shifting it and all of the information-storage device cases 24 behind it into a rearwardly leaning orientation and shifting all information-storage device cases 24 forward of it into forwardly leaning orientations. The front support structure 31 and rear support structure 32 of a storage bin 10 according to the present invention may have any of a number of different constructions. In some cases a front support structure 31 and/or a rear support structure 32 will be constituted by a flat continuous wall all of the surface points of which are "high points" that are disposed within the front support plane 33 or the rear support plane 34. The front support structure 31 illustrate in FIGS. 5, 7, 8, 9, 10, 11, 12, and 14 for example, is constituted by a flat continuous wall with all surface points thereof being "high points" that are disposed in the front support plane 33. In some cases the front support structure 31 and/or the rear support structure 32 will be constituted by a combination of tabs, bosses, rails, sheets, and/or any other type of structure that have three or more "high points" that lie in a front support plane 33 or a rear support plane 34. For instance, the rear support structure 32 shown in FIGS. 1, 2, 9, 10, 11, 12, and 14 includes rail 36 and tabs 37 and the "high points" of the rear support structure 32 include the upper forward edge 38 of rail 36 and the upper forward tips 39 of tabs 37. In some cases the front support structure 31 and/or rear support structure 32 will be attached to and/or defined by the upper storage recess sidewalls 13 and in other cases the front support structure 31 and/or the rear support structure 32 will be separate and distinct structure from the upper storage-recess sidewalls 13.

Figure 16:
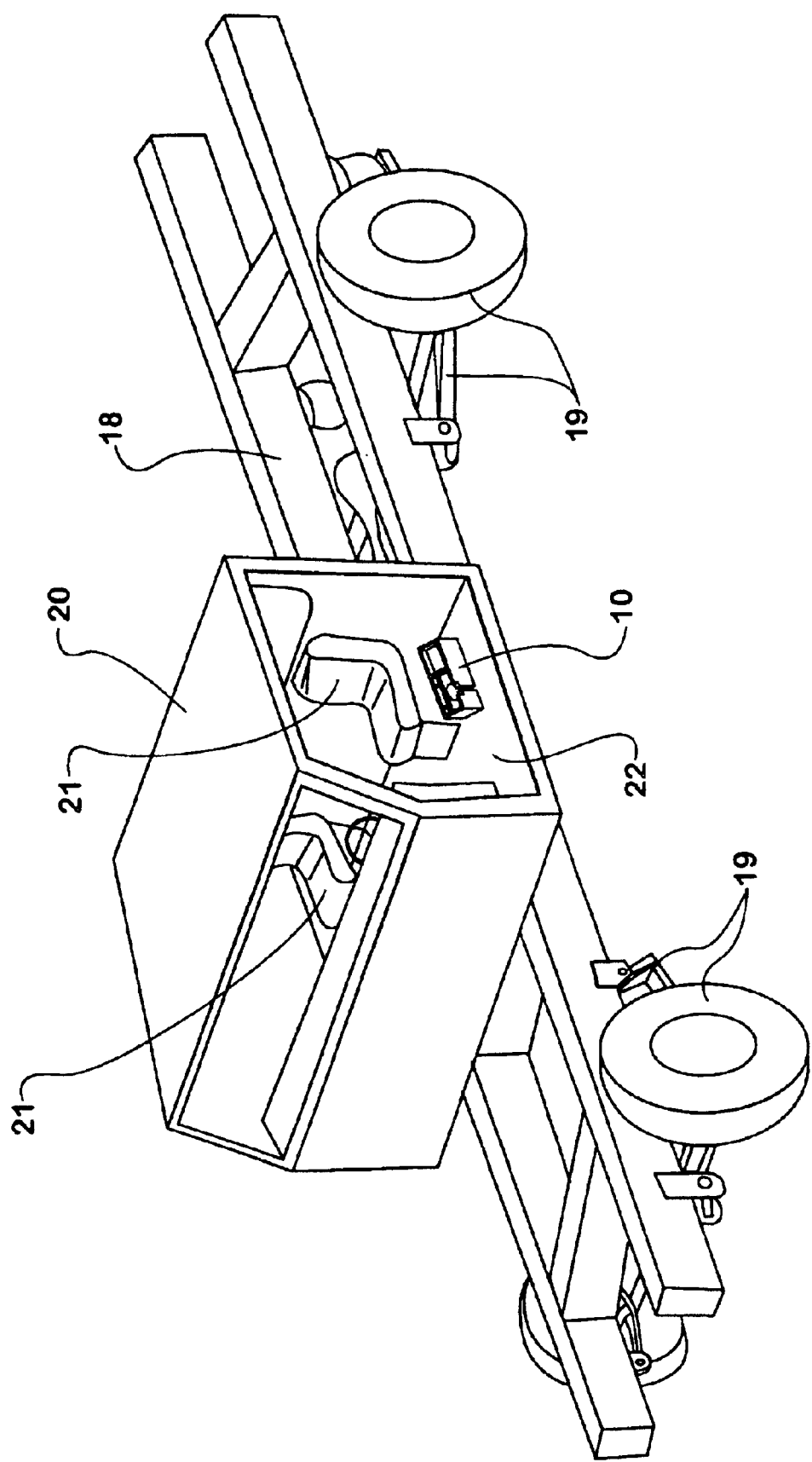
FIG. 16 is a perspective view of a vehicle with a storage bin according to the present invention mounted to the floor of the occupant cabin adjacent the base of an occupant seat.

It should be noted that the descriptors "side", "front", and "rear" have been applied to various structures of the storage bin 10 because the conventional interrelationships of these terms correspond to the interrelationships of those various structures of the storage bin 10. A storage bin 10 according to the present invention could certainly be mounted to another assembly in such an orientation that the "side", "front", and "rear" of the storage bin 10 and the assembly that it is mounted to do not correspond. For instance, in some embodiments of the present invention, a storage bin 10 according to the present invention will be mounted in a vehicle with its side rails 30 spaced from one another in the fore-and-aft direction of the vehicle. In fact, it can be seen that FIG. 16 illustrates a vehicle 42 with a storage bin 10 according to the present invention mounted thereto with the "front" of the storage bin 10 facing toward the "side" of the vehicle 42.

In some embodiments of the present invention the storage bin 10 is specially constructed with provisions for drinking vessels 28, such as the one shown in FIGS. 2, 3, 11, and 12, that have a cup handle 40. In such embodiments of the present invention the cup-holder sidewalls 16 define a vertically-extending cup-handle slot 17 through which the cup handle 40 of a drinking vessel 28 that is disposed in the cup-holder recess 14 may extend. Dependent upon the position and shape of the cup-holder opening 23 in the horizontal upper storage-recess floor 11, the horizontal upper storage-recess floor 11 may also define a cup-handle opening through which a cup handle 40 of a drinking vessel 28 that is disposed within the cup-holder recess 14 may extend. In some embodiments, such as the one illustrated in the Figures, the cup-holder opening 23 will be positioned adjacent an outer periphery of the horizontal upper storage-recess floor 11 and the storage bin 10 will be constructed with the cup-handle slot 17 extending radially outwardly through the cup-holder sidewalls 16 and all the way through outer surfaces of the storage bin 10. As can best be seen in FIGS. 2, 3, 11, and 12, in such embodiments, when a drinking vessel 28 is disposed within the cup-holder recess 14 with a cup handle 40 extending through the cup-handle slot 17, the cup handle 40 may extend beyond the outer surfaces of the storage bin 10 so that it may be very easily grasped by a user.

As was mentioned above, a storage bin 10 according to the present invention may be part of a number of different types of assemblies. A storage bin 10 according to the present invention is particularly useful, however, as a component of a vehicle 42. As can be seen in FIG. 16, such a vehicle 42 typically comprises one or more rigid and strong frame structures 18 to which a majority of other components of the vehicle 42 are directly or indirectly engaged and from which a majority of other components of the vehicle 42 are directly or indirectly supported. Such vehicles 42 also typically comprise a suspension system 19 to which the one or more frame structures 18 of the vehicle 42 are engaged and from which the one or more frame structures 18 of the vehicle 42 are suspended above the ground. The suspension system 19 of such vehicles 42 provides the vehicle 42 with a relatively low resistance to movement along the ground. Such vehicles 42 also often comprise occupant cabins 20 with one or more occupant seats 21 mounted upon the floor 22 of the occupant cabin 20. A storage bin 10 according to the present invention may be advantageously used as a part of such a vehicle 42 when mounted within the occupant cabin 20 of such a vehicle 42 in such a position that the storage bin 10 is located within arm's reach of a person seated in one of the occupant seats 21. In particular, it is an efficient use of space to mount a storage bin 10 according to the present invention adjacent a base of an occupant seat 21 of a vehicle 42 such as is the illustrated case of FIG. 16.

It will, of course, be understood that a storage bin 10 according to the present invention and an assembly to which it is mounted could be of any of a number of different constructions within the guidelines set forth above and that some features of the invention could be employed without a corresponding use of other features.

I claim:

1. A storage bin, comprising:
   (a) an upper storage recess that is defined by a horizontal upper storage-recess floor and storage-recess sidewalls that extend vertically upwardly adjacent outer edges of said horizontal upper storage-recess floor;
   (b) wherein said horizontal upper storage-recess floor defines a cup-holder opening;
   (c) wherein a cup-holder recess is defined between cup-holder sidewalls that are vertically-extending and are fully or partially cylindrical and/or conical in shape and that are disposed below said cup-holder opening defined by said horizontal upper storage-recess floor; and
   (d) a pair of side rails that are in facing relationship to one another on opposite sides of said upper storage recess, that are disposed substantially parallel to one another, and that are spaced from one another at a rail-to-rail distance with a magnitude of between an information-storage device case standard width and 20% greater than an information-storage device case standard width.

2. The storage bin of claim 1, wherein:
   (a) said storage bin comprises front support structure that is disposed above said horizontal upper storage-recess floor between said side rails and against which a planar surface of an information-storage device case may rest in a front support plane;
   (b) said storage bin comprises rear support structure that is disposed above said horizontal upper storage-recess floor between said side rails and against which a planar surface of an information-storage device case may rest in a rear support plane; and
   (c) wherein said front support structure and said rear support structure are constructed, positioned, and oriented in such a manner that said front support plane and said rear support plane are disposed at an upwardly-opening angle of 20–60 degrees relative to one another.

3. The storage bin of claim 2, wherein:
   (a) said cup-holder sidewalls define a vertically-extending cup-handle slot.

4. The storage bin of claim 3, wherein:
   (a) said cup-holder opening is defined adjacent a periphery of said horizontal upper storage-recess floor and said cup-handle slot extends radially outward from said cup-holder recess through outermost surfaces of said storage bin.

5. The storage bin of claim 1, wherein:
   (a) said cup-holder sidewalls define a vertically-extending cup-handle slot.

6. The storage bin of claim 5, wherein:
   (a) said cup-holder opening is defined adjacent a periphery of said horizontal upper storage-recess floor and said cup-handle slot extends radially outward from said cup-holder recess through an outermost surface of said storage bin.

7. A vehicle comprising:
   (a) one or more rigid and strong frame structures to which a majority of other components of said vehicle are directly or indirectly engaged and from which a majority of other components of said vehicle derive support directly or indirectly;
   (b) a suspension system that is engaged to and supports said one or more frame structures above the ground and that provides the vehicle with a relatively low resistance to movement along the ground;
   (c) an occupant cabin that is engaged to and supported by said one or more frame structures and within which occupants of said vehicle may reside;
   (d) one or more occupant seats engaged to and supported by a floor of said occupant cabin;
   (e) a storage bin disposed within and engaged to and supported by said occupant cabin;
   (f) wherein said storage bin comprises an upper storage recess that is defined by a horizontal upper storage-recess floor and upper storage-recess sidewalls that extend vertically upwardly adjacent outer edges of said horizontal upper storage-recess floor;
   (g) wherein said horizontal upper storage-recess floor defines a cup-holder opening;
   (h) wherein a cup-holder recess is defined between cup-holder sidewalls that are vertically-extending, that are fully or partially cylindrical and/or conical in shape and that are disposed below said cup-holder opening defined by said horizontal upper storage-recess floor; and
   (i) wherein said storage bin further comprises a pair of side rails that are in facing relationship to one another on opposite sides of said upper storage recess, that are disposed substantially parallel to one another, and that are spaced from one another at a rail-to-rail distance with a magnitude of between an information-storage device case standard width and 20% greater than an information-storage device case standard width.

8. The vehicle of claim 7, wherein:
   (a) said storage bin comprises front support structure that is disposed above said horizontal upper storage-recess floor between said side rails and against which a planar surface of an information-storage device case may rest in a front support plane;
   (b) said storage bin comprises rear support structure that is disposed above said horizontal upper storage-recess floor between said side rails arid against which a planar surface of an information-storage device case may rest in a rear support plane; and (c) wherein said front support structure and said rear support structure are constructed, positioned, and oriented in such a manner that said front support plane and said rear support plane are disposed at an upwardly-opening angle of 20–60 degrees relative to one another.

9. The vehicle of claim 8, wherein:
(a) said cup-holder sidewalls define a vertically-extending cup-handle slot.

10. The vehicle of claim 9, wherein:
(a) said cup-holder opening is defined adjacent a periphery of said horizontal storage-recess floor and said cup-handle slot extends radially outward from said cup-holder recess through outermost surfaces of said storage bin.

11. The vehicle of claim 10, wherein:
(a) said storage bin is located within arm's reach of one of said occupant seats.

12. The vehicle of claim 11, wherein:
(a) said storage bin is located adjacent a base of one of said occupant seats.

13. The vehicle of claim 7, wherein:
(a) said cup-holder sidewalls define a vertically-extending cup-handle slot.

14. The vehicle of claim 13, wherein:
(a) said cup-holder opening is defined adjacent a periphery of said horizontal storage-recess floor and said cup-handle slot extends radially outward from said cup-holder recess through outermost surfaces of said storage bin.

15. The vehicle of claim 7, wherein:
(a) said storage bin is located within arm's reach of one of said occupant seats.

16. The vehicle of claim 15, wherein:
(a) said storage bin is located adjacent a base of one of said occupant seats.

17. The vehicle of claim 7, wherein:
(a) said storage bin is located within arm's reach of one of said occupant seats.

18. The vehicle of claim 17, wherein:
(a) said storage bin is located adjacent a base of one of said occupant seats.

19. A storage bin, comprising:
(a) an upper storage recess that is defined by a horizontal upper storage-recess floor and storage-recess sidewalls that extend vertically upwardly adjacent outer edges of said horizontal upper storage-recess floor;
(b) wherein said horizontal upper storage-recess floor defines a cup-holder opening;
(c) wherein a cup-holder recess is defined between cup-holder sidewalls that are vertically-extending and are fully or partially cylindrical and/or conical in shape and that are disposed below said cup-holder opening defined by said horizontal upper storage-recess floor; and
(d) wherein said storage-recess sidewalls extend more than one inch above said storage-recess floor.

20. The storage bin of claim 19, wherein:
(a) said cup-holder sidewalls define a vertically-extending cup-handle slot.

21. A vehicle comprising:
(a) one or more rigid and strong frame structures to which a majority of other components of said vehicle are directly or indirectly engaged and from which a majority of other components of said vehicle derive support directly or indirectly;
(b) a suspension system that is engaged to and supports said one or more frame structures above the ground and that provides the vehicle with a relatively low resistance to movement along the ground;
(c) an occupant cabin that is engaged to and supported by said one or more frame structures and within which occupants of said vehicle may reside;
(d) one or more occupant seats engaged to and supported by a floor of said occupant cabin;
(e) a storage bin disposed within and engaged to and supported by said occupant cabin;
(f) wherein said storage bin comprises an upper storage recess that is defined by a horizontal upper storage-recess floor and upper storage-recess sidewalls that extend vertically upwardly adjacent outer edges of said horizontal upper storage-recess floor;
(g) wherein said horizontal upper storage-recess floor defines a cup-holder opening;
(h) wherein a cup-holder recess is defined between cup-holder sidewalls that are vertically-extending, that are fully or partially cylindrical and/or conical in shape and that are disposed below said cup-holder opening defined by said horizontal upper storage-recess floor; and
(i) wherein said storage-recess sidewalls extend more than one inch above said storage-recess floor.

22. The vehicle of claim 21, wherein:
(a) said cup-holder sidewalls define a vertically-extending cup-handle slot.

23. The vehicle of claim 21, wherein:
(a) said storage bin is located within arm's reach of one of said occupant seats.

24. The vehicle of claim 23, wherein:
(a) said storage bin is located adjacent a base of one of said occupant seats.

25. A storage bin, comprising:
(a) an upper storage recess that is defined by a horizontal upper storage-recess floor and storage-recess sidewalls that extend vertically upwardly adjacent outer edges of said horizontal upper storage-recess floor;
(b) wherein said horizontal upper storage-recess floor defines a cup-holder opening;
(c) wherein a cup-holder recess is defined between cup-holder sidewalls that are vertically-extending and are fully or partially cylindrical and/or conical in shape and that are disposed below said cup-holder opening defined by said horizontal upper storage-recess floor; and
(d) wherein said cup-holder sidewalls define a vertically-extending cup-handle slot.

26. The storage bin of claim 25, wherein:
(a) said cup-holder opening is defined adjacent a periphery of said horizontal upper storage-recess floor and said cup-handle slot extends radially outward from said cup-holder recess through an outermost surface of said storage bin.

27. A vehicle comprising:
(a) one or more rigid and strong frame structures to which a majority of other components of said vehicle are directly or indirectly engaged and from which a majority of other components of said vehicle derive support directly or indirectly;

(b) a suspension system that is engaged to and supports said one or more frame structures above the ground and that provides the vehicle with a relatively low resistance to movement along the ground;

(c) an occupant cabin that is engaged to and supported by said one or more frame structures and within which occupants of said vehicle may reside;

(d) one or more occupant seats engaged to and supported by a floor of said occupant cabin;

(e) a storage bin disposed within and engaged to and supported by said occupant cabin;

(f) wherein said storage bin comprises an upper storage recess that is defined by a horizontal upper storage-recess floor and upper storage-recess sidewalls that extend vertically upwardly adjacent outer edges of said horizontal upper storage-recess floor;

(g) wherein said horizontal upper storage-recess floor defines a cup-holder opening;

(h) wherein a cup-holder recess is defined between cup-holder sidewalls that are vertically-extending, that are fully or partially cylindrical and/or conical in shape and that are disposed below said cup-holder opening defined by said horizontal upper storage-recess floor; and (i) wherein said cup-holder sidewalls define a vertically-extending cup-handle slot.

28. The vehicle of claim 27, wherein:

(a) said cup-holder opening is defined adjacent a periphery of said horizontal storage-recess floor and said cup-handle slot extends radially outward from said cup-holder recess through outermost surfaces of said storage bin.

* * * * *